Oct. 4, 1955　　　　　N. B. PLACE　　　　　2,719,380
FISH HOOK
Filed March 12, 1954
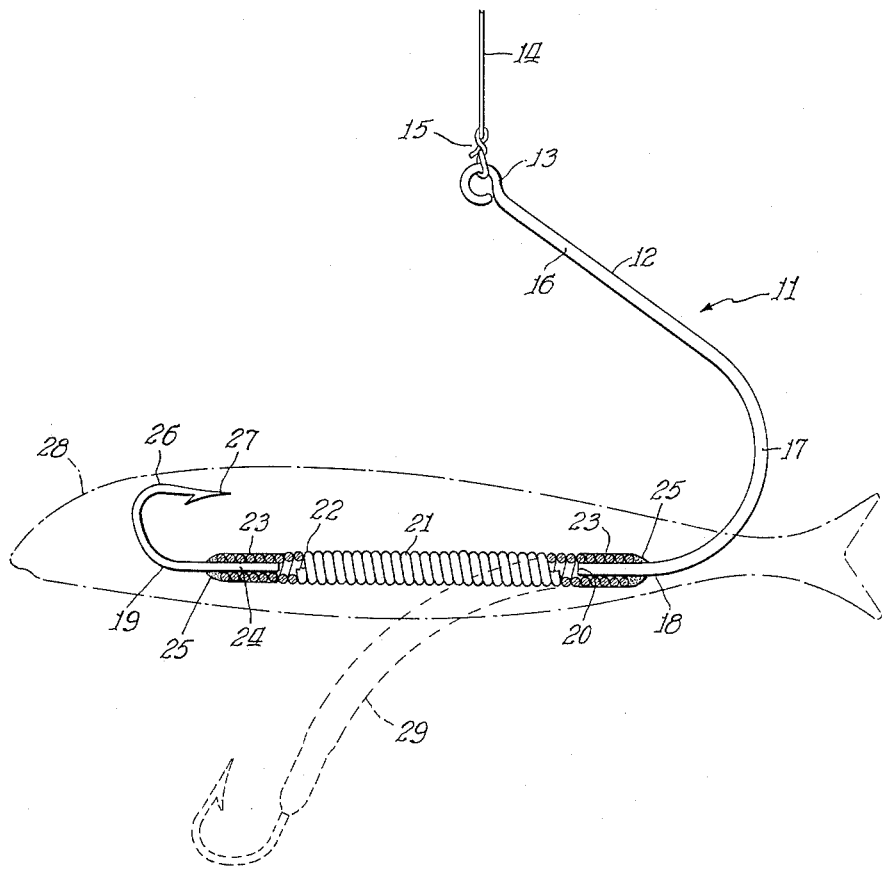
Inventor:
Nelson B. Place
By: Vernon C. Berdine, Atty.

United States Patent Office 2,719,380
Patented Oct. 4, 1955

2,719,380

FISH HOOK

Nelson B. Place, Antioch, Ill.

Application March 12, 1954, Serial No. 415,794

1 Claim. (Cl. 43—44.8)

This invention relates to fishhooks and particularly to a fishhook of the type suitable for catching game fish of substantial size.

Such hooks conventionally in order to have a certain strength have sacrificed flexibility and have been made relatively rigid, this not only detracting from the life-like appearance of the bait carried by the hook but also being subject to breakage by a sudden twist of the game fish, which is here referred to as the quarry.

In accordance with the present invention, I provide a hook of this type having an attaching portion, a hook-carrying portion transverse to the attaching portions, and a hook on the end of the hook-carrying portion, the hook-carrying portion incorporating a spring section whereby the hook may be universally flexed independently of the attaching portion while the hook-carrying portion is normally maintained transverse to the attaching portion, thus giving a life-like appearance to the bait as the hook moves through the water while providing a flexibility that permits the hook to flex with the movements of the quarry to minimize breakage.

The invention will be understood by reference to the accompanying drawing, showing an illustrative embodiment thereof, and in which drawing the figure is a view (that may be full size) of a fish hook embodying the present invention, a bait fish being shown associated therewith in broken lines, an alternative position of the hook being also similarly indicated.

Referring to the drawing there is there shown, indicated in general by the numeral 11, a fish hook made in accordance with the present invention and comprising parts made of a relatively heavy wire 12 of round cross-section and of tempered steel to give it resilience. At its upper end, the wire 12 is looped upon itself as at 13 to provide an eyelet through which the usual strong fish line 14 may be threaded and knotted as at 15. It will be understood that the line 14 is of such strength as to be suitable for catching game fish of substantial size.

From the eyelet 13 the wire 12 is extended obliquely downwardly and laterally to provide the attaching portion 16 of the hook and is then curved downwardly and inwardly upon itself as at 17 to merge into a portion 18 for carrying the hook 19 itself.

In accordance with the present invention, the hook-carrying portion 18 is discontinued as at 20 and is continued by a spring section 21 in the form of a coil spring having the relatively small coils or convolutions 22, and also desirably formed of tempered steel. Coil spring 22 normally extends horizontally and transversely of the attaching portion 16 for a substantial distance transversely thereof. At one end, the coil spring receives within its coils the termination 20 of the discontinued attaching portion 18, desirably a considerable number of coils 22 encircle the termination 20 as at 23, and at its other end the coil spring receives similarly the shank 24 of the hook proper 19. The termination 20 and shank 24 may be soldered or welded to the coil spring as at 25. The distances 23 at each end of the coil spring just referred to however are together substantially less than the total length of the coil spring 21, so that the greater part of the length of the coil spring is free of the wire 12.

The hook 19 may be turned upwardly and inwardly upon itself as at 26 to terminate in the usual barb 27.

Shown somewhat diagrammatically by the broken lines 28 is a bait such as a minnow or other somewhat larger small fish which may be threaded or impaled onto the hook-carrying portion 18 of the hook 11 to enclose and conceal not only the barb 27 but the other parts of the hook up to the attaching portion.

It will be noted that as thus arranged the coil spring 21 is within the carcass of the bait fish 28 and by reason of the discontinuance of the hook carrying portion 18 between its termination 20 and the shank 24 of the hook proper 19, the coil spring 22 permits the carcass of the bait fish to flex or wave as the fish line 14 is drawn through the water, for example, in trolling. At the same time, by reason of the normally transverse relationship of the hook-carrying portion 18 (including its spring section represented by the coil spring 21) in its relation to the attaching portion and to the line 14, the bait fish 28 is maintained in a generally horizontal or transverse position thus contributing further to its life-like appearance and enhancing its attractiveness to the game fish or quarry.

An additional function of the coil spring 21 is that as the quarry jerks, rolls, and twists in its efforts to escape and release itself from the hook, the hook-carrying portion flexes readily with the movements of the quarry and thus avoids a sudden stress on the wire of the hook which would otherwise frequently result in a breaking of the hook and loss of the quarry to the fisherman.

One direction in which the hook-carrying portion may flex is indicated in broken lines as at 29, and it will be understood that this indicates possible flexures both in the plane of the paper of the drawing sheet and transverse to that plane also, hereinbefore referred to as "universal" flexing. Other twisting or flexing actions in response to the movement of the quarry which the spring 21 will readily accommodate will be understood without further depiction. When unflexed the spring returns to horizontal by its inherent resilience.

An added advantage of the hook of my present invention is apparent in fishing through ice. In such practice, only a relatively small hole is permitted in the ice, usually under local law, and if the hook were rigid, and the game fish fighting to escape, the rigid hook would be brought into contact with the lower edge of the hole and the combined action would tend to scrape the fish off the hook and assist in its escape. In the present construction, since the hook is flexible independently of the attaching portion, the hook tends to straighten out into the line of pull of the fish and the hook and fish may be lifted nearly vertically past the lower edge of the hole in the ice.

The invention having been described, such changes may be made as fall within the scope of the appended claim without departing therefrom.

What is here claimed is:

A fishhook of the class described having an attaching portion, a hook-carrying portion transverse to the attaching portion, and a hook on the end of the hook-carrying portion, said hook-carrying portion incorporating a helical spring section between the attaching portion and the hook whereby the hook may be universally flexed independently of the attaching portion, said hook-carrying portion being normally maintained transverse to said attaching portion, said spring section including a coil spring consisting of relatively small closely compacted coils interposed between the hook proper and a portion of the hook-carrying portion, the shank of the last mentioned portion extending into and secured to the coil spring at one end of the coil spring for a limited distance and the shank of the hook proper extending for a limited distance into and secured to the coil spring at its other end, the sum of said distances being substantially less than the total length of the coil spring, whereby a strong but highly universally flexible horizontally disposable hook and hook carrying portion are provided while permitting a lure to be threaded thereon.

References Cited in the file of this patent

UNITED STATES PATENTS

| | | |
|---|---|---|
| 969,014 | Walters | Aug. 30, 1910 |
| 2,266,725 | Andrews | Dec. 23, 1941 |